(12) United States Patent
Aoki et al.

(10) Patent No.: US 10,805,827 B2
(45) Date of Patent: Oct. 13, 2020

(54) BASE STATION DEVICE, COMMUNICATION SYSTEM, AND BEAM CONTROL METHOD AND PROGRAM

(71) Applicant: SHARP KABUSHIKI KAISHA, Sakai, Osaka (JP)

(72) Inventors: Tsuguhiro Aoki, Sakai (JP); Shigeto Suzuki, Sakai (JP); Kennichi Iijima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/342,901

(22) PCT Filed: Aug. 24, 2017

(86) PCT No.: PCT/JP2017/030337
§ 371 (c)(1),
(2) Date: Apr. 17, 2019

(87) PCT Pub. No.: WO2018/100811
PCT Pub. Date: Jun. 7, 2018

(65) Prior Publication Data
US 2019/0246311 A1   Aug. 8, 2019

(30) Foreign Application Priority Data
Dec. 2, 2016   (JP) .................. 2016-235241

(51) Int. Cl.
*H04W 28/02*    (2009.01)
*H04W 16/28*    (2009.01)
(Continued)

(52) U.S. Cl.
CPC .......... *H04W 28/0268* (2013.01); *H04B 7/06* (2013.01); *H04W 16/28* (2013.01);
(Continued)

(58) Field of Classification Search
CPC ............. H04W 28/0268; H04W 16/28; H04W 28/0273; H04W 72/046; H04W 88/08; H04B 7/06
See application file for complete search history.

(56) References Cited

U.S. PATENT DOCUMENTS 6,347,234 B1 *  2/2002  Scherzer .............. H04B 7/0408
                                                         455/550.1
2002/0034967 A1   3/2002  Taniguchi et al.
(Continued)

FOREIGN PATENT DOCUMENTS

JP   2002-094448 A   3/2002
JP   2004-253849 A   9/2004

*Primary Examiner* — Luat Phung
(74) *Attorney, Agent, or Firm* — ScienBiziP, P.C.

(57) ABSTRACT

A base station device includes: a communication unit configured to communicate with a terminal device using a beam which is output in a specific direction; and a control unit. The control unit is configured to acquire a first communication traffic volume of communication with a first terminal device which is performed using a first beam, and control the communication unit such that the communication with the first terminal device is performed using a second beam different from the first beam based on the first communication traffic volume.

9 Claims, 7 Drawing Sheets

(51) Int. Cl.
*H04W 72/04* (2009.01)
*H04W 88/08* (2009.01)
*H04B 7/06* (2006.01)

(52) U.S. Cl.
CPC ..... *H04W 28/0273* (2013.01); *H04W 72/046* (2013.01); *H04W 88/08* (2013.01)

(56) References Cited

U.S. PATENT DOCUMENTS

| | | | | |
|---|---|---|---|---|
| 2003/0095065 | A1* | 5/2003 | Ericson | H01Q 1/246 342/354 |
| 2009/0286547 | A1* | 11/2009 | Tangemann | H04B 7/0408 455/452.2 |
| 2013/0244570 | A1* | 9/2013 | Park | H04B 7/18539 455/12.1 |
| 2015/0094076 | A1* | 4/2015 | Inoue | H04B 7/0697 455/452.1 |
| 2018/0159600 | A1* | 6/2018 | Kim | H04B 7/0617 |

* cited by examiner

MOBILE STATION DEVICE POSITION MANAGEMENT TABLE

| MOBILE STATION DEVICE ID | GROUP ID | REPRESENTATIVE POSITION |
|---|---|---|
| 01aa | G01 | (xx, yy) |
| 01bb | G02 | (xz, yx) |
| ⋮ | ⋮ | ⋮ |

BASE STATION DEVICE, COMMUNICATION SYSTEM, AND BEAM CONTROL METHOD AND PROGRAM

TECHNICAL FIELD

An embodiment of the invention relates to a base station device, a communication system, and a beam control method and program.

Priority is claimed on Japanese Patent Application No. 2016-235241, filed Dec. 2, 2016, the content of which is incorporated herein by reference.

BACKGROUND ART

A technique Of handling mobile station devices which are located adjacent to each other as one group and controlling a direction and a width of a beam which is emitted from an adaptive array antenna stich that one group is caught using one beam is known (for example, see Patent Document 1).

PRIOR ART DOCUMENT

Patent Document

[Patent Document 1] Japanese Unexamined Patent Application. First Publication No. 2002-94448

SUMMARY OF THE INVENTION

Problem to Be Solved by the Invention

However, when two mobile station devices are caught using one beam, communication resources such as a frequency band are commonly used by the mobile station devices. When a communication traffic volume of one or both of the two mobile station devices increases, a frequency band of a base station device is limited and thus there is concern that the frequency band may become insufficient to secure a communication speed.

An aspect of the invention has been made in consideration of the above-mentioned circumstances and an objective thereof is to prevent a frequency band from becoming insufficient.

Means for Solving the Problems

One aspect of the present invention is made to solve the above-described problem. A first aspect of the present invention is a base station device including: a communication unit configured to communicate with a terminal device using a beam which is output in a specific direction; and a control unit, wherein the control unit is configured to acquire a first communication traffic volume of communication with a first terminal device which is performed using a first beam, and control the communication unit such that the communication with the first terminal device is performed using a second beam different from the first beam based on the first communication traffic volume.

In addition, a second aspect of the present invention is a communication system including: a terminal device; and a base station device that is able to communicate with the terminal device, wherein the base station device includes a communication unit configured to communicate with the terminal device using a beam which is output in a specific direction, and a control unit, wherein the control unit is configured to acquire a first communication traffic volume of communication with a first terminal device which is performed using a first beam, and control the communication unit such that the communication with the first terminal device is performed using a second beam different from the first beam based on the first communication traffic volume.

In addition, a third aspect of the present invention is a beam control method which is performed by a base station device that is able to communicate with a terminal device, the beam control method including; a step of communicating with the terminal device using a beam which is output in a specific direction; a step of acquiring a first communication traffic volume of communication with a first terminal device which is performed using a first beam; and a step of performing control such that the communication with the first terminal device is performed using a second beam different from the first beam based on the first communication traffic volume.

In addition, a third aspect of the present invention is a program causing a computer of a base station device to perform: a step of communicating with a terminal device using a beam which is output in a specific direction; a step of acquiring a first communication traffic volume of communication with a first terminal device which is performed using a first beam; and a stop of performing control such that the communication with the first terminal device is performed using a second beam different from the first beam based on the first communication traffic volume.

Effect of the Invention

According to the embodiment of the invention, it is possible to prevent a frequency band from becoming insufficient

EMBODIMENTS FOR CARRYING OUT THE INVENTION

Figure 1:
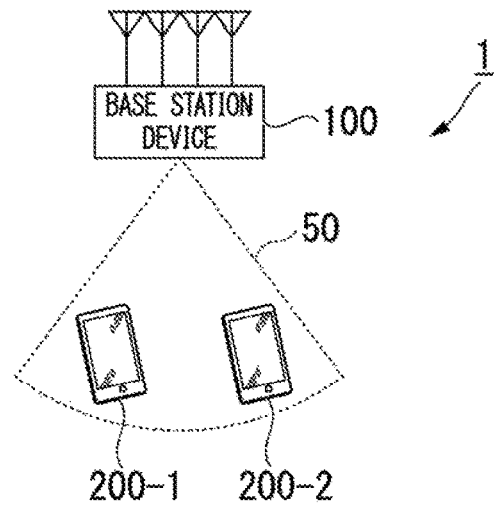
FIG. 1 is a diagram schematically illustrating a communication system according to a first embodiment.

Hereinafter, embodiments of the invention will be described in detail with reference to the accompanying drawings. In the drawings, the same elements will be referred to by the same reference signs.

First Embodiment

A first embodiment of the invention will be described.

FIG. 1 is a diagram schematically illustrating an example of a configuration of a communication system 1 according to the first embodiment.

As illustrated I FIG. 1, the communication system 1 includes a base station device 100, a mobile station device 200-1, and a mobile station device 200-2. When the mobile station device 200-1 and the mobile station device 200-2 are not distinguished from each other, they are collectively referred to as a mobile station device 200.

The base station device 100 transmits and receives data to and from the mobile station device 200 in a wireless manner. The base station device 100 includes an ultramulti-element antenna and controls antenna directionality by electrically controlling the amplitude and phase of radio waves which are emitted from the antenna elements.

An example of the base station device 100 corresponds to the standard specification of 5G which is called 5G New Radio (5G NR) and performs radio communication with the mobile station device 200 by massive MIMO in which beam forming is performed with a small beam width using a plurality of antenna elements.

The mobile station device 200 is a communication device that can communicate with another device by an image, a voice, or text. Examples of the mobile station device 200 include terminal devices such as a mobile phone, a smartphone, and a tablet terminal, a vehicle, a truck, a bus, a motorbike, a subway, a drone, and a robot.

The outline of the communication system 1 will be described below.

The base station device 100 measures communication traffic volumes of the mobile station devices 200 which are located in an area covered by the base station device 100. Specifically, the base station device 100 measures a communication traffic volume, that is, a communication speed or a throughput, every predetermined lime for each mobile station device 200. The base station device 100 groups the mobile station devices in which a bandwidth for transmitting the total communication traffic volume which is a sum of the communication traffic volumes of the mobile station devices 200 is equal to or less than a bandwidth of one beam which is emitted from the ultramulti-element antenna of the base station device 100 and which are located adjacent to each other.

A bandwidth represents a communication channel capacity, and a communication channel capacity represents an upper limit of an amount of information which can be transmitted via a communication channel (a beam).

The base station device 100 continues to measure the communication traffic volumes of the mobile station devices included in the group and determines whether a bandwidth for transmitting the total communication traffic volume which is a sum of the communication traffic volumes of the mobile station devices included in the group is greater than a bandwidth of one beam, When the bandwidth for transmitting the total communication traffic volume which is a sum of the communication traffic volumes of the mobile Ration devices included in the group is greater than a bandwidth of one beam, the base station device 100 separates the mobile station devices included in the group into different groups.

(Base Station Device)

Figure 2:
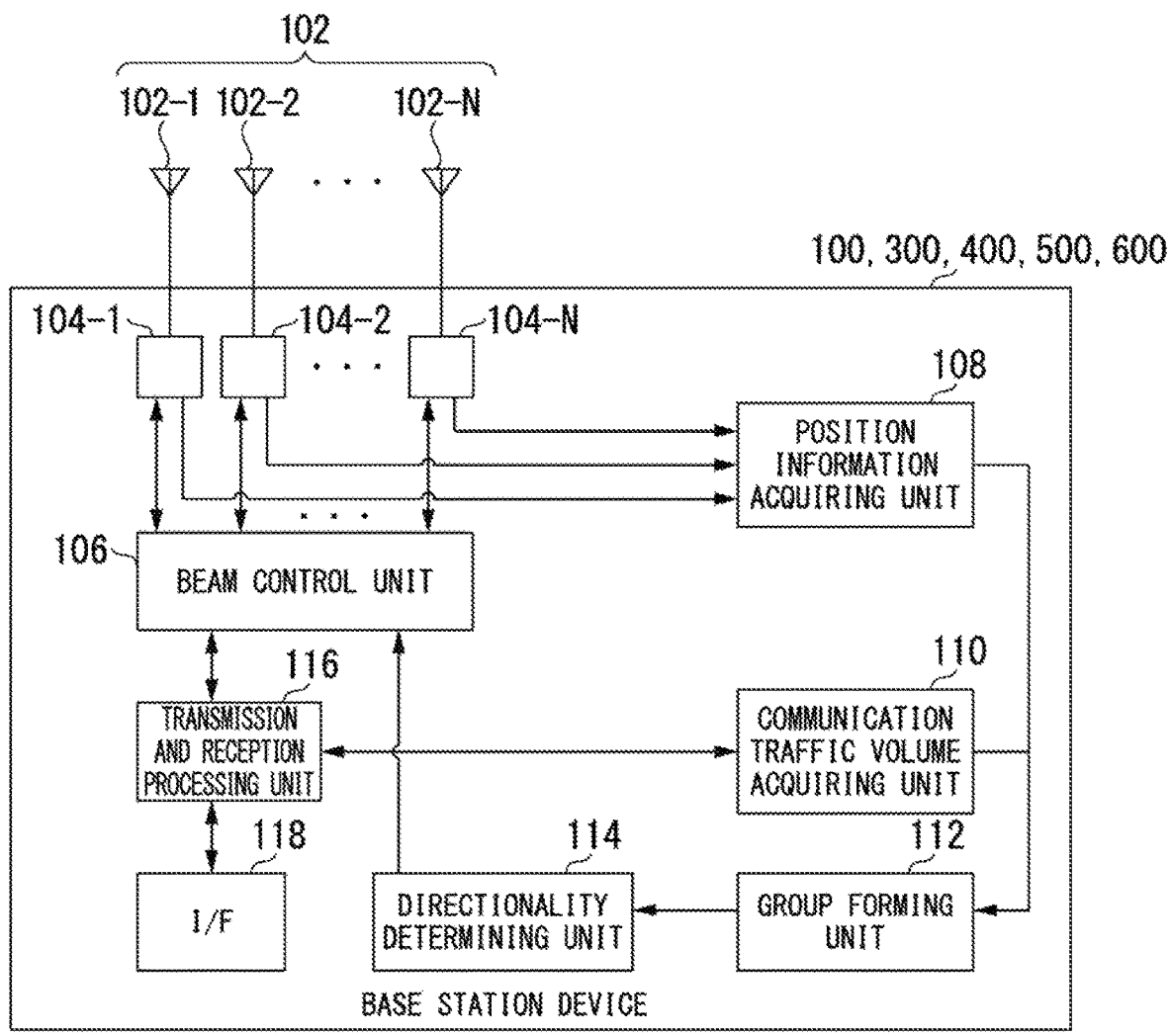
FIG. 2 is a functional block diagram illustrating a base station device according to the first embodiment.

FIG. 2 is a diagram schematically illustrating the configuration of the base station device 100 according to the first embodiment.

The base station device 100 includes an ultramulti-element antenna that includes a plurality of antenna elements 102-1 to 102-N and can change directions and widths (emission angles) of one or more beams and emit the one or more beams, a plurality of duplexers 104-1 to 104-N that are provided to correspond to the plurality of antenna elements 102-1 to 102-N, a beam control unit 106, a position information acquiring unit 108, a communication traffic volume acquiring unit 110, a group forming unit 112, a directionality determining unit 114, a transmission and reception processing unit 116, and an interlace (I/F) 118 that is connected to, for example, a public network.

The antenna elements 102-1 to 102-N transmit and receive signals to and from the mobile station device 200.

The duplexers 104-1 lo 104-N are connected to the antenna elements 102-1 to 102-N, respectively, and separate signals which are transmitted and received via the antenna elements 102-1 to 102-N into a position information signal and a signal other than the position information signal by groups, for example, depending on a difference in frequency band. Here, the position information signal is a signal for calculating a position of each mobile station device 200 relative to the base station device 100 in order to control a beam. The signal other than the position information signal includes a signal of a traffic channel or a signal of a control channel which is used for multiple access control.

The beam control unit 106 is connected to the duplexers 104-1 to 104-N and controls the antenna elements 102-1 to 102-N such that one or more beams are emitted from the ultramulti-element antenna 102 in a desired direction at a desired beam width and a desired transmission level in accordance with an instruction from the directionality determining unit 114 which will be described later. The beam control unit 106 exchanges signals which are transmitted and received to and from the mobile station devices 200 using a beam with the transmission and reception processing unit 116 for each beam which is entitled from the ultramulti-element antenna 102.

The transmission and reception processing unit 116 is connected to the beam control unit 106 and the I/F 118, separates a signal for each beam output from the beam control unit 106 into signals by mobile station devices, and outputs the separated signals to the I/F 118 and the communication traffic volume acquiring unit 110. The transmission and reception processing unit 116 outputs the signals for the mobile station devices 200 received from the I/F 118 to the communication traffic volume acquiring unit 110, and generates a signal for each beam by multiplexing the signals for each beam which is used to transmit signals from the mobile station devices as sources of the signals. Then, the transmission and reception processing unit 116 outputs the signal for each beam to the beam control unit 106.

The position information acquiring unit 108 is connected to the duplexers 104-1 to 104-N and periodically calculates positions of the mobile station devices 200-1 to 200-2 relative to the base station device 100 based on the position information signals output from the duplexes 104-1 to 104-N. The position information acquiring trait 108 outputs information indicating the positions of the mobile station devices 200-1 to 200-2 relative to the have station device 100 to the group forming unit 112. Specifically, Global Positioning System (GPS) is installed in the mobile station devices 200-1 to 200-2. The mobile station devices 200-1 to 200-2 transmits a signal including a current position (an absolute position expressed by latitude and longitude) acquired from the GPS as a position information signal. When the position information signals transmitted from the mobile station devices 200-1 to 200-2 are acquired, the position information acquiring unit 108 calculates the positions of the mobile station devices 200-1 to 200-2 relative to the base station device 100 from the current positions of the mobile station devices 200-1 to 200-2 and an installation position of the base station device 100.

The communication traffic volume acquiring unit 110 is connected to the transmission and reception processing unit 116. When the result of separation of the signal for each beam into a signal for each mobile station device and the signals toward the mobile station devices 200 are acquired from the transmission and reception processing unit 116, the communication traffic volume acquiring unit 110 measures a communication traffic volume every predetermined lime for each mobile station device based on the result of separation of the signal for each beam into a signal for each mobile station device and the signals toward the mobile station devices 200. Specifically, the communication traffic volume acquiring unit 110 measures the communication traffic volume for each mobile station device by calculating throughputs from the result of separation of the signal for each beam into a signal for each mobile station device and the signals toward the mobile station devices 200. When the communication traffic volume for each mobile station device is measured, the communication traffic volume acquiring unit 110 outputs information indicating the communication traffic volume for each mobile station device to the group forming unit 112.

The group forming unit 112 is connected to the position information acquiring unit 108 and the communication traffic volume acquiring unit 110. When information indicating the positions of the mobile station devices 200-1 to 200-2 relative to the base station device 100 is acquired from the position information acquiring unit 108 and information indicating the communication traffic volume for each mobile station device is acquired from the communication traffic volume acquiring unit 110, the group forming unit 112 groups the mobile station devices based on the information indicating the relative positions and the information indicating the communication traffic volume for each mobile station device. Specifically, the group forming unit 112 groups the mobile station devices which are located close to each other and in which the bandwidth for transmitting the total communication traffic volume of the communication traffic volumes of the mobile station devices located close to each other is not greater than the bandwidth of one beam emitted from the ultramulti-element antenna 102. When the distance therebetween is less than a threshold value, the group forming unit 112 determines that the mobile station devices are located close to each other. The group forming unit 112 calculates a representative position of a group based on the information indicating the relative positions of the mobile station devices included in each group. Specifically, the group forming unit 112 calculates an average position of the relative positions of the mobile station devices included in a group and sets the average position of the relative positions as the representative position of the group. Here, the group forming unit 112 groups the mobile station device 200-1 and the mobile station device 200-2. When the mobile station devices 200-1 to 200-2 are grouped, the group forming unit 112 updates a mobile station device position management table based on the grouping result.

Figures 3, 4:
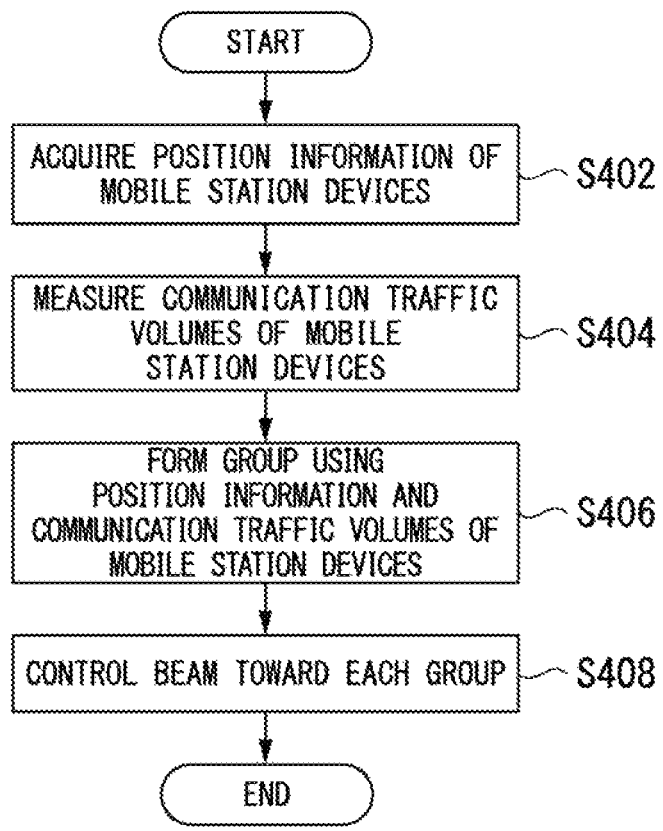
FIG. 3 is a diagram illustrating an example of a mobile station device position management table.
FIG. 4 is a flowchart illustrating a (first) example of an operation of the base station device according to the first embodiment.

FIG. 3 illustrates an example of the mobile station device position management table. In the mobile station device position management table, identification information of a mobile station device such as a mobile station device ID, identification information of a group such as a group ID of the group to which the mobile station device belongs, and information indicating a representative position of the group are correlated with each other. In the example illustrated in FIG. 3, a mobile station device ID "01aa," a group ID "G01," and a representative position "(xx, yy)" are correlated with each other.

The directionality determining unit 114 is connected to the beam control unit 106, determines a direction, a beam width (an emission angle), and a transmission level of a beam which is emitted toward each group formed by the group forming unit 112 front the ultramulti-element antenna 102, and outputs information indicating the direction of the beam, information indicating the beam width, and information indicating the transmission level to the beam control unit 106. Specifically, the directionality determining unit 114 determine a direction, a beam width (an emission angle), and a transmission level of abeam which is emitted toward each group from the ultramulti-element antenna 102 based on information indicating the representative position of each group stored in the mobile station device position management table and the positions of the mobile station devices included in the group.

(Operation of Communication System (First))

FIG. 4 is a flowchart illustrating an example of the operation of the communication system according to the embodiment. FIG. 4 illustrates the operation of grouping the mobile station device 200 which is performed by the base station device 100.

In Step S402, the position information acquiring unit 108 of the base station device 100 acquires position information of the mobile station devices 200 which are located in an area covered by the base station device 100.

In Step S404, the communication traffic volume acquiring unit 110 of the base station device 100 measures communication traffic volumes of the mobile station devices 200 which are located in the area covered by the base station device 100.

In Step S406, the group forming unit 112 of the base station device 100 forms groups based on the position information of the mobile station devices 200 and the communication traffic volumes of the mobile station devices 200. Specifically, the group forming unit 112 groups the mobile station devices which are located close to each other and in which the bandwidth for transmitting the loud communication traffic volume of the communication traffic volumes of the mobile station devices 200 located close to each other is not greater than the bandwidth of one beam which is emitted from the ultramulti-element antenna 102.

In Step S408, the directionality determining unit 114 of the base station device 100 determines the direction, the beam width, and the transmission level of a beam which is emitted toward each group formed by the group forming unit 112 from the ultramulti-element antenna 102. The directionality determining unit 114 outputs information indicating the directions of the beams, information indicating the beam widths, and information indicating the transmission levels to the beam control unit 106. When the information indicating the directions of the beams, the information indicating the beam widths, and the information indicating the transmission levels are acquired from the directionality determining unit 114, the beam control unit 106 controls the antenna elements 102-1 to 102-N such that one or more beams are emitted from the ultramulti-element antenna 102 in desired directions at desired beam widths and desired transmission levels based on the information indicating the directions of the beams, the information indicating the beam widths, and the information indicating the transmission levels.

(Operation of Communication System (Second))

Figure 5:
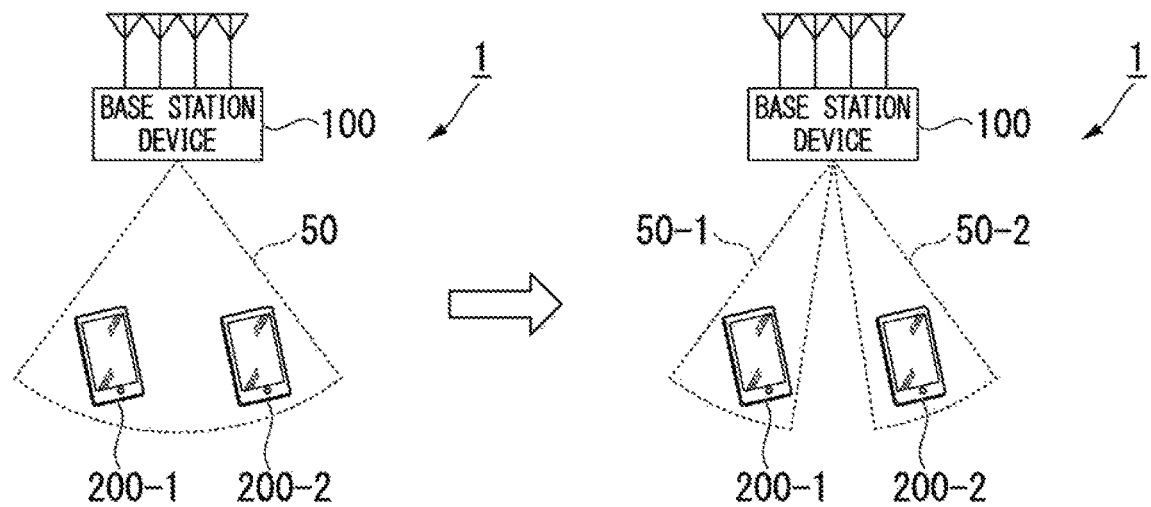
FIG. 5 is a diagram illustrating an example of an operation of the communication system according to the first embodiment.

FIG. 5 is a diagram illustrating an example of the operation of the communication system according to the embodiment.

FIG. 5 illustrates the operation of the base station device 100 after the mobile station devices 200 have been grouped. In the communication system 1 illustrated in the left part of FIG. 5, the base station device 100 forms a group including the mobile station device 200-1 and the mobile station device 200-2 and emits a beam 50 to the group. Here, it is assumed that the upper limit of the bandwidth of the one beam 50 emitted from the base station device 100 is 100. It is assumed that the communication traffic volume of the mobile station device 200-1 is 50 and the communication traffic volume of the mobile station device 200-2 is 40. The total communication traffic volume of the communication traffic volume of the mobile station device 200-1 and the communication traffic volume of the mobile station device 200-2 is 90 which is equal to or less than 100 which is the upper limit of the bandwidth of one beam 50 emitted from the ultramulti-element antenna 102. Next, the case in which the communication traffic volume of the mobile station device 200-2 increases from 40 to 60 in this state will be described. Due to the increase of the communication traffic volume of the mobile station device 200-2, the total communication traffic volume of the communication traffic volume of the mobile station device 200-1 and the communication traffic volume of the mobile station device 200-2 is 110 which is greater than 100 which is the upper limit of the bandwidth of one beam emitted from the base station device 100.

When the total communication traffic volume is greater than the upper limit of the bandwidth of one beam, the base station device 100 performs control such that different beams are emitted to the mobile station device 200-1 and the mobile station device 200-2. Specifically, as illustrated in the right part of FIG. 5, the base station device separates the group including the mobile station device 200-1 and the mobile station device 200-2 into a group including the mobile station device 200-1 and a group including the mobile station device 200-2. Then, the base station device 100 emits a beam 50-1 to the group including the mobile station device 200-1 and emits a beam 50-2 to the group including the mobile station device 200-2.

Figure 6:
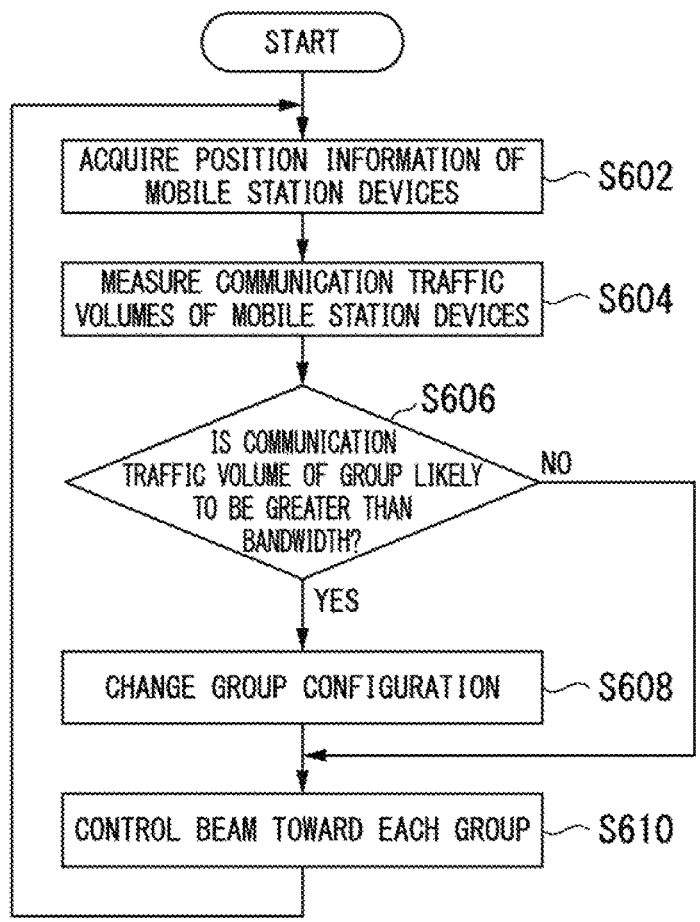
FIG. 6 is a flowchart illustrating a (second) example of the operation of the base station device according to the first embodiment.

FIG. 6 is a flowchart illustrating an example of the operation of the communication system according to the embodiment.

FIG. 6 illustrates the operation of separating the mobile station devices 200 included in a group after grouping the mobile station devices 200 which is performed by the base station device 100.

In Step S602, the position information acquiring unit 108 of the base station device 100 acquires position information of the mobile station devices 200 which are located in the area covered by the base station device 100.

In Step S604, the communication traffic volume acquiring unit 110 of the base station device 100 measures communication traffic volumes of the mobile station devices 200 which are located in the area covered by the base station device 100.

In Step S606, the group forming unit 112 of the base station device 100 determines whether a bandwidth for transmitting, the total communication traffic volume of the communication traffic volumes of the mobile station devices 200 included in the group is greater than the upper limit of the bandwidth of a beam based on the position information of the mobile station devices 200 and the communication traffic volumes of the mobile station devices 200.

In Step S608, when it is determined that the bandwidth for transmitting the total communication traffic volume of the communication traffic volumes of the mobile station devices 200 included in the group is greater than the upper limit of the bandwidth of a beam, the group forming unit 112 of the base station device 100 changes the configuration of the mobile station devices 200 included in the group. Specifically, the group forming unit 112 separates the mobile station devices included in the group. That is, the group forming unit 112 separates the group into a group including the mobile station device 200-1 and a group including the mobile station device 200-2.

Step S610 is performed by the directionality determining unit 114 of the base station device 100 after the configuration of the mobile station devices 200 included in the group has been changed or when it is determined that the bandwidth for transmitting the total communication traffic volume of the communication traffic volumes of the mobile station devices 200 included in the group is not greater than the upper limit of the bandwidth of a beam. The directionality determining unit 114 determines directions, beam widths, and transmission levels of beams which are emitted toward the groups from the ultramulti-element antenna 102. The directionality determining unit 114 outputs information indicating the directions of the beams, information indicating the beam widths, and information indicating the transmission levels to the beam control unit 106. When the information indicating the directions of the beams, the information indicating the beam widths, and the information indicating the transmission levels which are output from the directionality determining unit 114 are acquired, the beam control unit 106 controls the antenna elements 102-1 to 102-N such that one or more beams are emitted from the ultramulti-element antenna 102 in desired directions at desired beam widths and desired transmission levels based on the information indicating the directions of the beams, the information indicating the beam widths, and the information indicating the transmission levels.

With the communication system according to the first embodiment, the base station device 100 acquires position information and a communication traffic volume for each mobile station device 200. The base station device 100 groups the mobile station devices 200 in which a bandwidth for transmitting the total communication traffic volume of the communication traffic volumes is equal to or less than a bandwidth of one beam and which are located close to each other. With the communication system, when the communication traffic volumes of the mobile station devices 200 included in the group increase, the base station device 100 dynamically changes the mobile station devices 200 included in the group and changes control of a beam with the change. According to this configuration, when a group including one or more mobile station devices is caught using one beam and the communication traffic volumes of the one or more mobile station devices included in the group increase, it is possible to prevent the group train not being caught due to an insufficient band.

Second Embodiment

A second embodiment of the invention will be described below.

Figure 7:
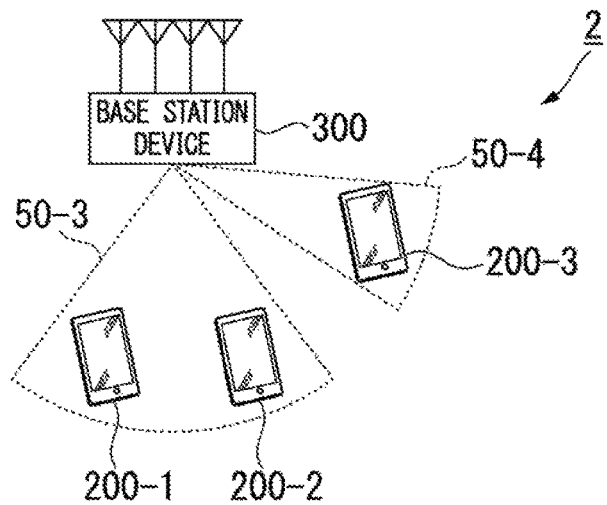
FIG. 7 is a diagram schematically illustrating a communication system according to a second embodiment.

FIG. 7 is a diagram schematically illustrating an example of a configuration of a communication system according to the second embodiment.

As illustrated in FIG. 7, a communication system 2 includes a base station device 300, a mobile station device 200-1, a mobile station device 200-2, and a mobile station device 200-3. In the following description, when the mobile station device 200-1, the mobile station device 200-2, and the mobile station device 200-3 are not distinguished from each other, they are collectively referred to as a mobile station device 200.

In the communication system 2, the base station device 300 changes a mobile station device 200 included in one group of groups formed by the base station device 300 when a bandwidth for transmitting the total communication traffic volume of communication traffic volumes of the mobile station devices 200 included in the group is greater than a bandwidth of one beam which is emitted front an ultramulti-element antenna 102, of the base station device 300.

(Base Station Device)

FIG. 2 can be applied to the base station device 300 according to the second embodiment, When information indicating positions of the mobile station devices 200-1 to 200-1 relative to the base station device 300 is acquired front the position information acquiring unit 108 and information indicating the communication traffic volume of each mobile station device is acquired front the communication traffic volume acquiring unit 110, the group forming unit 112 groups the mobile station devices based on the information indicating the relative positions and the information indicating the communication traffic volumes of the mobile station devices. Specifically, the group forming unit 112 groups the mobile station devices which are located close to each other and the bandwidth for transmitting the total communication traffic volume of the communication traffic volumes of the mobile station devices located close to each other is not greater than the bandwidth of one beam which is emitted from the ultramulti-element antenna 102. When the distance between the mobile station devices is less than a threshold value, the group forming unit 112 determines that the mobile station devices are located close to each other. The group forming unit 112 calculates a representative position of each group based on the information indicating the relative positions of the mobile station devices included in the groups. Specifically, the group forming unit 112 calculates an average of the relative positions of the mobile station devices included in the group and sets the average of the relative positions as the representative position of the group. Here, the group forming unit 112 groups the mobile station device 200-1 and the mobile station device 200-2 and groups the mobile station device 200-3. When the mobile station devices 200-1 and 200-2 are grouped and the mobile station device 200-3 is grouped, the group forming unit 112 updates a mobile station device position management table based on the grouping result.

(Operation of Communication System)

Figure 8:
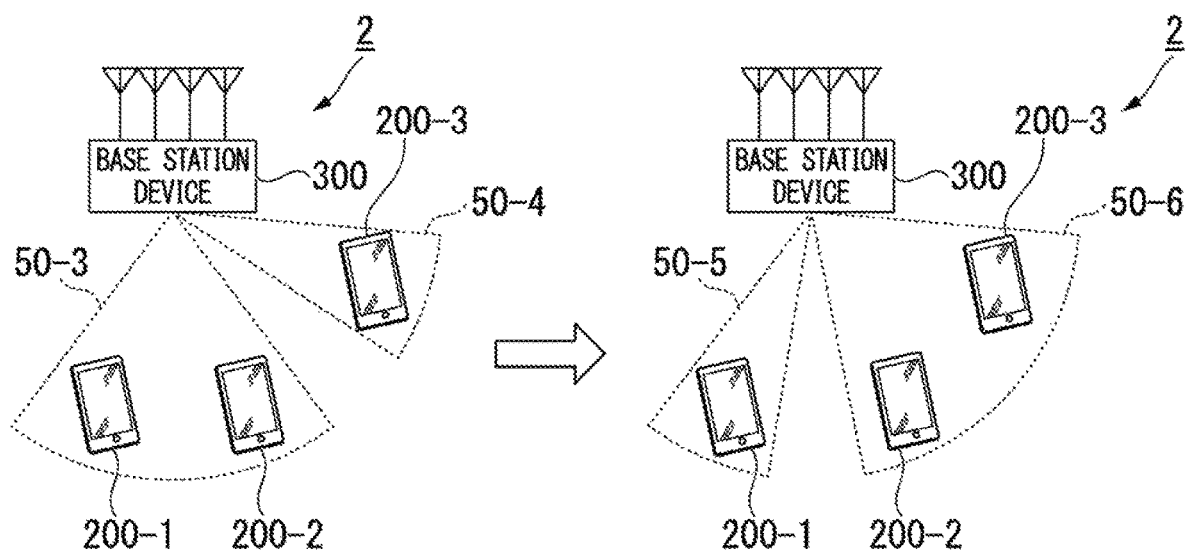
FIG. 8 is a diagram illustrating an example of an operation of the communication system according to the second embodiment.

FIG. 8 is a diagram illustrating an example of an operation of the communication system according to this embodiment. FIG. 8 illustrates the operation of the base station device 300 after the mobile station devices 200 are grouped. The operation of grouping the mobile station devices 200 can employ the first embodiment.

In the communication system 2 illustrated in the left part of FIG. 8, the base station device 300 forms a first group including the mobile station device 200-1 and the mobile station device 200-2 and a second group including the mobile station device 200-3. Then, the base station device 300 emits a beam 50-3 to the first group and emits a beam 50-4 to the second group. Here, it is assumed that the upper limit of the bandwidth of one beam 50 omitted from the base station device 300 is 100. It is assumed that the communication traffic volume of the mobile station device 200-1 is 50, the communication traffic volume of the mobile station device 200-2 is 40, and the communication traffic volume of the mobile station device 200-3 is 30. The total communication traffic volume of the communication traffic volume of the mobile station device 200-1 and the communication traffic volume al the mobile station device 200-2 is 90 which is equal to or less than 100 which is the upper limit of the bandwidth of one beam 50-3 emitted from the ultramulti-element antenna 102. The communication traffic volume of the mobile station device 200-3 is 30 which is equal to or less than 100 which is the upper limit of the bandwidth of one beam 50-4 omitted from the ultramulti-element antenna 102. Next, the case in which the communication traffic volume of the mobile station device 200-2 increases from 40 to 60 in this state will be described. Due to the increase of the communication traffic volume of the mobile station device 200-2, the total communication traffic volume of the communication traffic volume of the mobile station device 200-1 and the communication traffic volume of the mobile station device 200-2 is 110 which is greater than 100 which is the upper limit of the bandwidth of one beam 50-3 emitted from the base station device 300.

When the total communication traffic volume is greater than the upper limit of the bandwidth of one beam 50-3, the base station device 300 performs control such that different beams are emitted to the mobile station device 200-1 and the mobile station device 200-2. The base station device 300 determines whether the bandwidth for transmitting the total communication traffic volume of the communication traffic volume of the mobile station device 200-3 and the communication traffic volume of the mobile station device 200-2, the two mobile station devices 200-3 being located close to each other and being included in different groups, is greater than the upper limit of the bandwidth of one beam which is emitted from the base station device 300. When it is determined that the total communication traffic volume is not greater than the upper limit of the bandwidth of one beam emitted front the base station device 300, the base station device 300 groups the mobile station device 200-2 and the mobile station device 200-3 as illustrated in the right part of FIG. 8. As a result, the base station device 300 forms a first group including the mobile station device 200-1 and a second group including the mobile station device 200-2 and the mobile station device 200-3.

When it is determined that the total communication traffic volume is greater than the upper limit of the bandwidth of one beam emitted from the base station device. 300, the base station device 300 forms a first group including the mobile station device 200-1, a second group including the mobile station device 200-2, and a third group including the mobile station device 200-3.

In the communication system according to the second embodiment, the base station device 300 acquires position information and a communication traffic volume for each mobile station device. The base station device 300 groups the mobile station devices in which a bandwidth for transmitting the total communication traffic volume of the communication traffic volumes is equal to or less than the bandwidth of one beam and which are located close to each other. In the communication system, when the communication traffic volume of one mobile station device 200 included in the group increase and the bandwidth for transmitting the total communication traffic volume of the communication traffic volume of the mobile station device 200 of which the communication traffic volume has increased arid the communication traffic volume of one mobile station device 200 included in one of the groups other than the group is equal to or less than the bandwidth of one beam, the base station device 300 changes the mobile station device of which the communication traffic volume has increased to another group. By employing this configuration, when a group including one or more mobile station devices is caught using one beam and the communication traffic volume of one or more mobile station devices included in the group increases, the mobile station devices 200 included in the groups can be dynamically changed without changing the number of beams which are emitted from the base station device 300 and thus it is possible to prevent a mobile station device 200 from not being caught due to an insufficient band.

Third Embodiment

A third embodiment of the invention will be described below.

Figure 9:
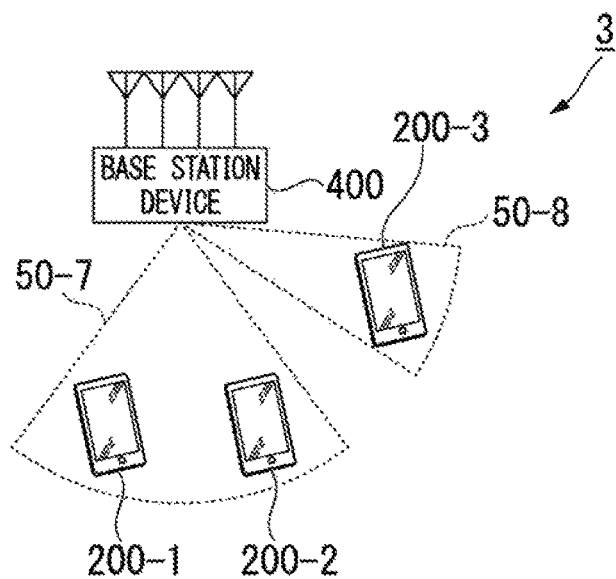
FIG. 9 is a diagram schematically illustrating a communication system according to a second embodiment.

FIG. 9 is a diagram schematically illustrating an example of a configuration of a communication system according to the third embodiment.

As illustrated in FIG. 9, a communication system 3 includes a base station device 400, a mobile station device 200-1, a mobile station device 200-2, and a mobile station device 200-3. In the following description, when the mobile station device 200-1, the mobile station device 200-2, and the mobile station device 200-3 are not distinguished from each other, they are collectively referred to as a mobile station device 200.

In the communication system 3, when a bandwidth for transmitting the total communication traffic volume of the communication traffic volumes of the mobile station devices included in at least two groups of the groups formed by the base station device 400 is equal to or less than a bandwidth of one beam which is emitted from an ultramulti-element antenna of the base station device 300, the base station device 400 merges the at least two groups.

(Base Station Device)

FIG. 2 can be applied to the base station device 400 according to the third embodiment. When information indicating positions of the mobile station devices 200-1 to 200-3 relative to the base station device 400 is acquired from the position information acquiring unit 108 and information indicating the communication traffic volume of each mobile station device is acquired from the communication traffic volume acquiring unit 110, the group forming unit 112 groups the mobile station devices based on the information indicating the relative positions and the information indicating the communication traffic volumes of the mobile station devices. Specifically, the group forming unit 112 groups the mobile station devices which are located close to each other and the bandwidth for transmitting the total communication traffic volume of the communication traffic volumes of the mobile station devices located close to each other is not greater than the bandwidth of one beam which is emitted from the ultramulti-element antenna 102. When the distance between the mobile station devices is less than a threshold value, the group forming unit 112 determines that the mobile station devices are located close to each other. The group forming unit 112 calculates a representative position of each group based on the information indicating the relative positions of the mobile station devices included in the groups. Specifically, the group forming unit 112 calculates an average of the relative positions of the mobile station devices included in the group and sets the average of the relative positions as the representative position of the group. Here, the group forming unit 112 groups the mobile Station device 200-1 and the mobile station device 200-2 and groups the mobile station device 200-3. When the mobile station devices 200-1 and 200-2 are grouped and the mobile station device 200-3 is grouped, the group forming unit 112 updates a mobile station device position management table based on the grouping result.

When the bandwidth for transmitting the total communication traffic volume of the communication traffic volumes of the mobile station devices 200 included in at least two groups of the formed groups is equal to or less than the bandwidth of one beam which is emitted from an ultramulti-element antenna of the base station device 400, the group forming unit 112 merges the at least two groups. Then, the group forming unit 112 calculates a position representative of the merged group based on the information indicating the relative positions of the mobile station devices included in the merged groups. Here, the group forming unit 112 merges the group including the mobile station device 200-1 and the mobile station device 200-2 and the group including the mobile station device 200-3. When the group including the mobile station devices 200-1 and 200-2 and the group including the mobile station device 200-3 are merged, the group forming unit 112 updates a mobile station device position management table based on the merging result.

(Operation of Communication System)

Figure 10:
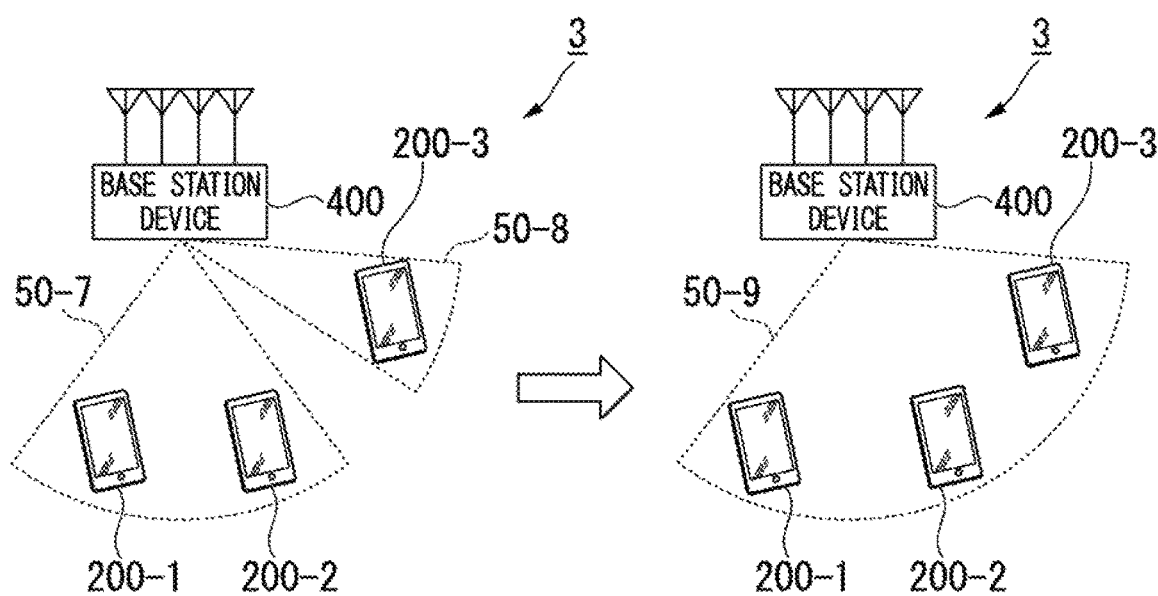
FIG. 10 is a diagram illustrating an example of an Operation of the communication system according to the second embodiment.

FIG. 10 is a diagram illustrating an example of an operation of the communication system according to this embodiment. FIG. 10 illustrates the operation of the base station device 400 after the mobile station devices 200 are grouped. The operation of grouping the mobile station devices 200 can employ the first embodiment.

In the communication system 3 illustrated in the left part of FIG. 10, the base station device 400 forms a first group including the mobile station device 200-1 and the mobile station device 200-2 and a second group including the mobile station device 200-3. Then, the base station device 400 emits a beam 50-7 to the first group and emits a beam 50-8 to the second group. Here, it is assumed that the upper limit of the bandwidth of one beam 50-7 or one beam 50-8 emitted from the base station device 400 is 100. It is assumed that the communication traffic volume of the mobile station device 200-1 is 50, the communication traffic volume of the mobile station device 200-2 is 40, and the communication traffic volume of the mobile station device 200-3 is 30. The total communication traffic volume of the communication traffic volume of the mobile station device 200-1 and the communication traffic volume of the mobile station device 200-2 is 90 which is equal to or less than 100 which is the upper limit of the bandwidth of one beam 50-7 emitted from the ultramulti-element antenna 102.

The communication traffic volume of the mobile station device 200-3 is 30 which is equal to or less than 100 which is the upper limit of the bandwidth of one beam 50-8 emitted from the ultramulti-element antenna 102. Next, the case in which the communication traffic volume of the mobile station device 200-1 decreases from 50 to 20 in this state will be described.

Due to the decrease of the communication traffic volume of the mobile station device 200-1, the total communication traffic volume of the communication traffic volume of the mobile station device 200-1 and the communication traffic volume of the mobile station device 200-2 is 60. When the communication traffic volume of the mobile station device included in at least one group decreases, the base station device 400 determines whether the total communication traffic volume of the communication traffic volume of the mobile station device included in the at least one group and the communication traffic volume of the mobile station device included in a group which is other than the at least one group and which is located close to the at least one group is equal to or less than the upper limit of the bandwidth of one beam.

When the total communication traffic volume is equal to or less than the bandwidth of one beam emitted from the base station device 400, the base station device 400 merges the at least one group and the other group. As a result, as illustrated in the right part of FIG. 10, the first group including the mobile, station device 200-1 and the mobile station device 200-2 and the second group including the mobile station device 200-3 are merged. That is, the base station device 400 forms a group including the mobile station device 200-1, the mobile station device 200-2, and the mobile station device 200-3.

When the total communication traffic volume is greater than the upper limit of the bandwidth of one beam emitted from the base station device 400, the base station device 400 forms the first group including the mobile station device 200-1 and the mobile station device 200-2 and the second group including the mobile station device 200-3.

Figure 11:
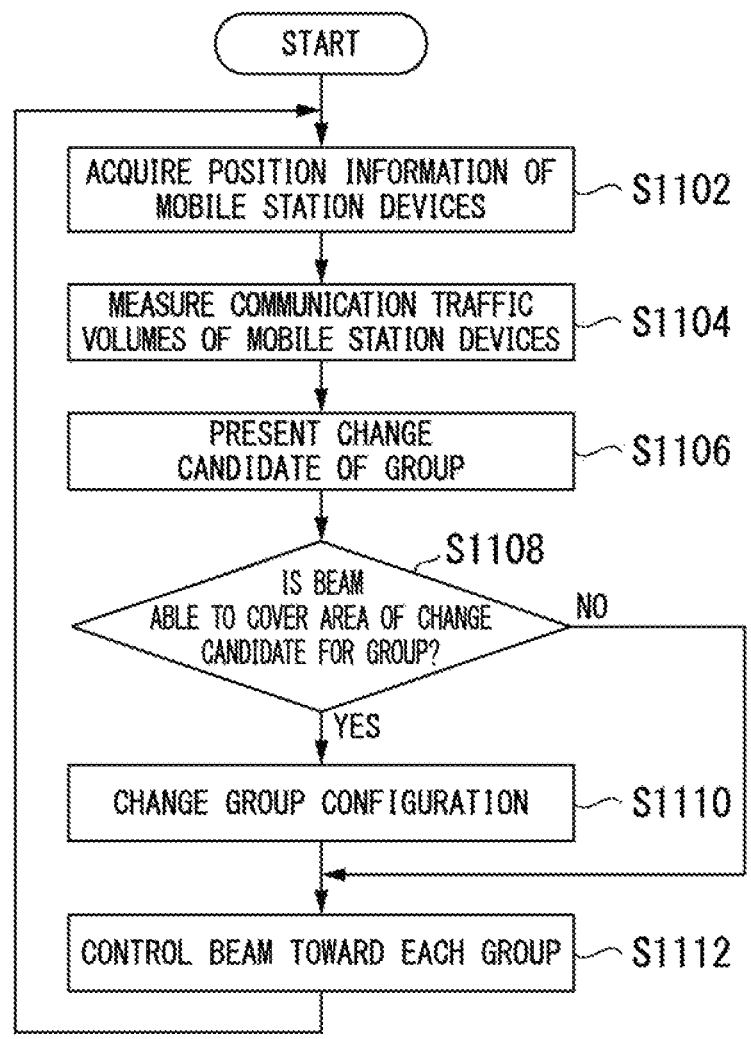
FIG. 11 is a flowchart illustrating an example of an operation of a base station device according to the third embodiment.

FIG. 11 is a flowchart illustrating an example of the operation of the communication system according to the embodiment.

FIG. 11 illustrates the operation of the base station device 400 when the communication traffic volume of a mobile station device 200 included in a group decreases after grouping the mobile station devices 200.

In Step S1102, the position information acquiring unit 108 of the base station device 403 acquires position information of the mobile station devices 200 which are located in the area covered by the base station device 400.

In Step S1104, the communication traffic volume acquiring unit 110 of the base station device 400 measures communication traffic volumes of the mobile station devices 200 which are located in the area covered by the base station device 400.

In Step S1106, the group forming unit 112 of the base station device 400 calculates a group candidate for change based on the position information of the mobile station devices 200 and the communication on traffic volume of the mobile station devices 200. Specifically, the group forming unit 112 presents a group candidate in which the total communication traffic volume after group change is equal to or less than the bandwidth of one beam.

In Step S1108, group forming unit 112 of the base station device 400 determines whether a beam can cover an area of the group candidate which is formed by the group change. Specifically, the group forming unit 112 determines whether the group candidate presented in Step S1106 is in the area which can be covered by one beam.

In Step S1110, when it is determined that the group candidate formed by the group change can be covered by one beam, the group forming unit 112 of the base station device 400 changes the group configuration. Specifically, when the total communication traffic volume is equal to or less than the bandwidth of one beam, the group forming unit 112 merges at least two groups into one group.

In Step S1112, after the group configuration has been changed or when it is determined that the group candidate formed by the group change for the reason why the total communication traffic volume is greater than the bandwidth of one beam cannot be covered by one beam, the directionality determining unit 114 of the base station device 400 determines directions, beam widths, and transmission levels of beams which are emitted from the ultramulti-element antenna 102 toward the groups. The directionality determining unit 114 outputs information indicating the directions of the beams, information indicating the beam widths, and information indicating the transmission levels to the beam control unit 106. When the directions, the beam widths, and the transmission levels of the beams emitted to the groups are acquired from the directionality determining unit 114, the beam control unit 106 controls the antenna elements 102-1 to 102-N such that one or more beams are emitted from the ultramulti-element antenna 102 in desired directions at desired beam widths and desired transmission levels based on the directions, the beam widths, and the transmission levels of the beams which are emitted toward the groups.

In the communication system according to the third embodiment, when the communication traffic volume of a mobile station device included in at least one group decreases, the base station device determines whether the total communication traffic volume of the communication traffic volume of the mobile station device included in the at least one group and the communication traffic volume of the mobile station device included in a group which is other than the at least one group and which is located close to the at least one group is equal to or less than the bandwidth of one beam. When the total communication traffic volume is equal to less than the bandwidth of one beam, the base station device merges the group including the mobile station device of which the communication traffic volume has decreased and the other group. By employing this configuration, when a group including one or more mobile station devices is caught using one beam and the communication traffic volumes of one or more mobile station devices included in the group decreases, it is possible to reduce the number of beams which are emitted from the base station device.

Fourth Embodiment

A fourth embodiment of the invention will be described below.

An example of the configuration of a communication system according to the fourth embodiment can employ the configuration illustrated in FIG 1.

The station device 100 can be applied as the base station device according to the fourth embodiment. The position information acquiring unit 108 of the base station device periodically calculates positions of the mobile station devices 200-1 and 200-2 relative to the base station device 100 based on position information signals output from the duplexers 104-1 to 104-N. The position information acquiring unit 108 outputs information indicating the positions of the mobile station devices 200-1 and 200-2 relative to the base station device 100 to the group forming unit 112. Specifically, the position information acquiring unit 108 calculates reception levels of uplink signals which are transmitted from the mobile station devices 200-1 and 200-2 and estimates the positions of the mobile station devices 200-1 200-2 based on the reception levels and directions of beams when the uplink signals are received. When the positions of the mobile station devices 200-1 and 200-2 are estimated, the position information acquiring unit 108 calculates the positions of the mobile station devices 200-1 and 200-2 relative to the base station device 100 based on the current positions of the mobile station devices 200-1 and 200-2 and the installation position of the base station device.

In the communication system according to the fourth embodiment, even when is station devices 200 included in a group do not include a GPS, the positions of the mobile station devices 200 can be estimated based on the uplink signals which are transmitted from the mobile station devices 200. With this communication system, the base device can acquire position information and a communication traffic volume for each mobile station device. The base station device can group mobile station devices in which a bandwidth for transmitting the total communication traffic volatile of the communication traffic volumes is equal to or less than the bandwidth of one beam and which are heated close to each other.

Fifth Embodiment

A fifth embodiment of the invention will be described below.

Figure 12:
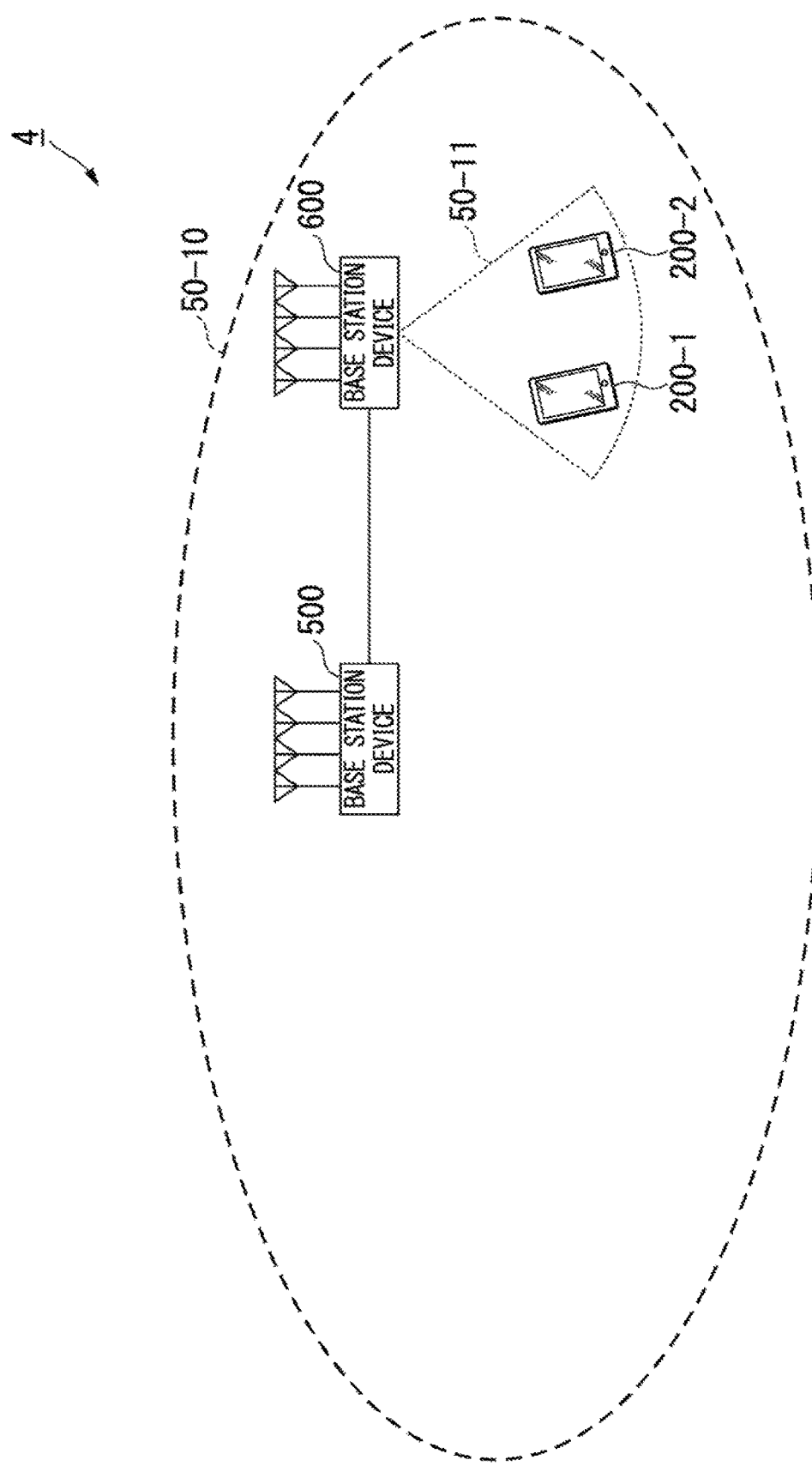
FIG. 12 is a diagram schematically illustrating a communication system according to a fifth embodiment.

FIG. 12 is a diagram schematically illustrating an example of a configuration of a communication system 4 according to the fifth embodiment.

As illustrated in FIG. 12, the communication system 4 includes a base station device 500, a base station device 600, a mobile station device 200-1 and a mobile station device 200-2, in the following description, when the mobile station device 200-1 and the mobile station device 200-2, they are collectively referred to as a mobile station device 200.

The base station device 500 is a base station device corresponding to the standard specification of Long Term Evolution (LTE) and wirelessly transmits and receives data to and from the mobile station devices 200 in an elliptical area 50-10 in FIG. 12. The base station device 600 is a base station device corresponding to the standard specification of 5G and wirelessly transmits and receives data to and from the station devices 200. The base station device 600 includes an ultramulti-element antenna and controls antenna directionality by electrically controlling the amplitude and phase of radio waves which are emitted from the antenna elements. A frequency band which is used by the base station device 500 and a frequency band which is used by the base station device 600 are different from each other.

An example of the base station device 600 is a small-cell base station device (a small-cell eNodeB) and the configuration thereof can employ the base station device 100. A radius of a cell which is provided by the small-cell base station device ranges, from several tens in to several km which is a relatively narrow range. That is, a small-cell base station device is a base station device having a narrow communication range with the mobile station devices 200. The radius of the small cell which is provided by the small-cell base station device is less than the radius of the cell which is provided by the base station device 500, and a part or all of the range of the small cell may overlap the range of the cell.

The base station device 500 measures positions of the mobile station devices 200 from reception states of radio waves of the mobile station devices 200 in the area 50-10, position information signals of the GPS, or the like, and transmits the position information of the mobile station devices 200 to the base station device 600 which is close to and is able to communicate with the mobile station devices 200 via the I/F 118.

When the position information of the mobile station devices 200 transmitted from the base station device 500 in the area 50-10 is acquired from the I/F 118, the transmission and reception processing unit 116 of the base station device 600 outputs information indicating a direction of a beam, information indicating a beam width, and information indicating a transmission level to the beam control unit 106.

When the information indicating the directions of the beams output from the transmission and reception processing unit 116, information indicating the beam widths, and information indicating the transmission levels are acquired, the beam control unit 106 controls the antenna elements 102-1 to 102-N such that one or more beams are emitted from the ultramulti-element antenna 102 in desired directions at desired beam widths and desired transmission levels based on the information indicating the directions of the beams output from the transmission and reception processing unit 116, information indicating the beam widths, and information indicating the transmission levels.

In the communication system according to this embodiment, by transmitting position information of mobile station devices 200 from the base station device 500 to the base station device 600, at least a part of an area which is covered by the base station device 500 can be covered by the base station device 600. Accordingly, a communication capacity can be enlarged in an area with much traffic.

Sixth Embodiment

A sixth embodiment of the invention will be described below

An example of the configuration of a communication system according to the sixth embodiment can employ the configuration illustrated in FIG 1.

The base station device 100 can be applied as the base station device according to the sixth embodiment. When the result of separation of a signal for each beam into signals for each mobile station device and signals toward the mobile station devices 200 are acquired from the transmission and reception processing unit 116, the communication traffic volume acquiring unit 110 of the base station device estimates a starting states of an application for each mobile station device based on the result of separation of a signal for each beam into signals for each mobile station device and the signals toward the mobile station devices 200. Specifically, the communication traffic volume acquiring unit 110 determines whether an, application such as a virtual reality (VR) application, an augmented reality (AR) application, a 4K/8K moving image, a browser, an e-mail, and a telephone is started for each mobile station device based on the result of separation of a signal for each beam into signals for each mobile station device and the signals toward the mobile station devices 200. The communication traffic volume acquiring unit 110 estimates a communication traffic volume of each mobile station device according to the started application. When the communication traffic volume of each mobile station device is estimated, the communication traffic volume acquiring unit 110 outputs information indicating the communication traffic volume of each mobile station device to the group forming unit 112.

In the communication system according to the sixth embodiment, by estimating an application which is started by a mobile station device included in a group, it is possible to estimate the communication traffic volume of the mobile station device. With the communication system, the base station device can acquire position information and a communication traffic volume for each mobile station device. The base station device can group mobile station devices in which a bandwidth for transmitting the total communication traffic volume of the communication traffic volumes is equal to or less than the bandwidth of one beam and which are located close to each other.

Seventh Embodiment

A seventh embodiment of the invention will be described below.

An example of the configuration of a communication system according to the seventh embodiment can employ the configuration illustrated in FIG. 1.

The base station device 100 can be applied is the base station device according to the seventh embodiment. When the result of separation of at signal for each beam into signals for each mobile station device and signals toward the mobile station devices 200 are acquired from the transmission and reception processing unit 116, the communication traffic volume acquiring unit 110 of the base station device estimates the communication traffic volumes by identifying data based on the result of separation of a signal for each beam into signals for each mobile station device and are signals toward the mobile station devices 200. Specifically, the communication traffic volume acquiring unit 110 identifies data from header information of packets, an ID address, a port number, a uniform resource locator (URL), or the like based on the result of separation of a signal for each beam into signals for each mobile station device and the signals toward the station devices 200. The communication traffic volume acquiring unit 110 estimates a communication traffic volume of each mobile station device according to the result of data identification. When the communication traffic volume of each mobile station device is estimated, the communication traffic volume acquiring unit 110 outputs information indicating the communication traffic volume of each mobile station device to the group forming unit 112.

In the communication system according to the seventh embodiment, by identifying data which is transmitted and received by a mobile station device included in a group, it is possible to estimate the communication traffic volume of the mobile station device. With the communication system, the base station device can acquire position information and a communication traffic volume for each mobile station device. The base station device can group mobile station devices in which a bandwidth for transmitting the total communication traffic volume of the communication traffic volumes is equal to or less than the bandwidth of one beam and which are located close to each other.

In the above-mentioned embodiments, beams may be emitted by beam forming or may be emitted by pre-coding multiple-input multiple output (MIMO).

The pre-coding is determined by a propagator matrix indicating reception qualities between the antennas of the base station device and the mobile station devices. This propagator matrix depends on a position of a terminal device.

In the above-mentioned embodiment, the base station devices 100, 300, 400, 500, and 600 may request the mobile station devices 200 for position information or propagation path information at the time of grouping. That is, the base station devices 100, 300, 400, 500, and 600 acquires position information or propagation path information based on the total communication traffic volume of communication traffic volumes of a plurality of mobile station device 200. In response to the request, each mobile station device 200 transmits its position information or propagation path information to the base station devices 100, 300, 400, 500, and 600.

While embodiments of the invention have been described above, these embodiments are presented as examples and are not intended to limit the scope of the invention. These embodiments can be embodied in various other forms and can be subjected to various omissions, substitutions, alterations, and combinations without departing from the gist of the invention. These embodiments are included in the scope or the gist of the invention and are also included in the scope of the invention described in the appended claims and equivalents thereof.

The base station device 100, the base station device 300, the base station device 400, the base station device 500, the base station device 600, and the mobile station device 200 have a computer therein. The processes of the above-mentioned devices are stored in the form of a program in a computer-readable recording medium, and the processes are performed by causing the computer to read and execute the program. Examples of a computer-readable recording medium include a magnetic disk, a magneto-optical disc, a CD-ROM, a DVD-ROM, and a semiconductor memory. The computer program may be transmitted to a computer via a communication line and the computer having received the computer program may execute the program. The program may be designed to realize some of the above-mentioned functions. The program may be a so-called differential file (a differential program) which can realize the above-mentioned functions in combination with a program which is already recorded in the computer system.

INDUSTRIAL APPLICABILITY

Some aspects of the invention can be applied to a base station device, a communication system, a beam control method, and a beam control program that need to prevent a frequency band from becoming insufficient.

DESCRIPTION OF THE REFERENCE SYMBOLS 1, 2, 3, 4 . . . Communication system
100, 300, 400, 500, 600 . . . Base station device
200 . . . Mobile station device
102-1 to 102-N . . . Antenna element
104 . . . Duplexer
106 . . . Beam control unit
108 . . . Position information acquiring unit.
110 . . . Communication traffic volume acquiring unit
112 . . . Group forming unit
114 . . . Directionality determining unit
116 . . . Transmission and reception processing unit
118 . . . I/F

The invention claimed is:

1. A base station device comprising:
a control unit configured to
acquire a first communication traffic volume and a second communication traffic volume, the first communication traffic volume being of a first communication with a first terminal device, the first communication being performed using a first beam which is output in a first direction, the second communication traffic volume being of a second communication with a second terminal device, the second communication being performed using the first beam, and determine whether or not the first communication is performed using the first beam or a second beam, the second beam being different from the first beam, the determination being performed based on the sum of the first communication traffic volume and the second communication traffic volume; and a communication unit configured to perform the first communication using one of the first beam and the second beam determined by the control unit.

2. The base station device according to claim 1, wherein the control unit is configured to acquire a first position of the first terminal device and a second position of the second terminal device, and control the communication unit such that the first communication and the second communication are performed using one beam based on a distance between the first position and the second position.

3. The base station device according to claim 1, wherein the control unit is configured to acquire a third communication traffic volume of a third communication with a third terminal device, the third communication being performed using a third beam, and control the communication unit such that the first communication and the third communication are performed using one beam based on the first communication traffic volume and the third communication traffic volume.

4. The base station device according to claim 1, wherein the control unit is configured to control the communication unit such that the first communication is performed using the second beam based on an application which is started by the first terminal device.

5. The base station device according to claim 1, wherein the control unit is configured to control the communication unit such that the first communication and a third communication with a third terminal device are performed using one beam based on an application which is started by the first terminal device.

6. A communication system comprising:
a first terminal device;
a second terminal device; and
a base station device that is able to communicate with the first and second terminal devices,
wherein the base station device comprises
a control unit configured to acquire a first communication traffic volume and a second communication traffic volume, the first communication traffic volume being of a first communication with a first terminal device, the first communication being performed using a first beam which is output in a first direction, the second communication traffic volume being of a second communication with a second terminal device, the second communication being performed using the first beam, and determine whether or not the first communication is performed using the first beam or a second beam, the second beam being different from the first beam, the determination being performed based on the sum of the first communication traffic volume and the second communication traffic volume; and a communication unit configured to perform the first communication using one of the first beam and the second beam determined by the control unit.

7. The base station device according to claim 1, wherein the control unit is configured to determine that the first communication is performed using the second beam in case that the sum is greater than a predetermined value.

8. The base station device according to claim 7, wherein the control unit is configured to determine that the first communication is performed using the first beam in case that the sum is not greater than the predetermined value.

9. A non-transitory computer readable recording medium storing a program causing a computer of a base station device to perform:

acquiring a first communication traffic volume and a second communication traffic volume, the first communication traffic volume being of a first communication with a first terminal device, the first communication being performed using a first beam which is output in a first direction, the second communication traffic volume being of a second communication with a second terminal device, the second communication being performed using the first beam;

determining whether or not the first communication is performed using the first beam or a second beam, the second beam being different from the first beam, the determination being performed based on the sum of the first communication traffic volume and the second communication traffic volume; and performing the first communication using one of the first beam and the second beam determined.

* * * * *